UNITED STATES PATENT OFFICE.

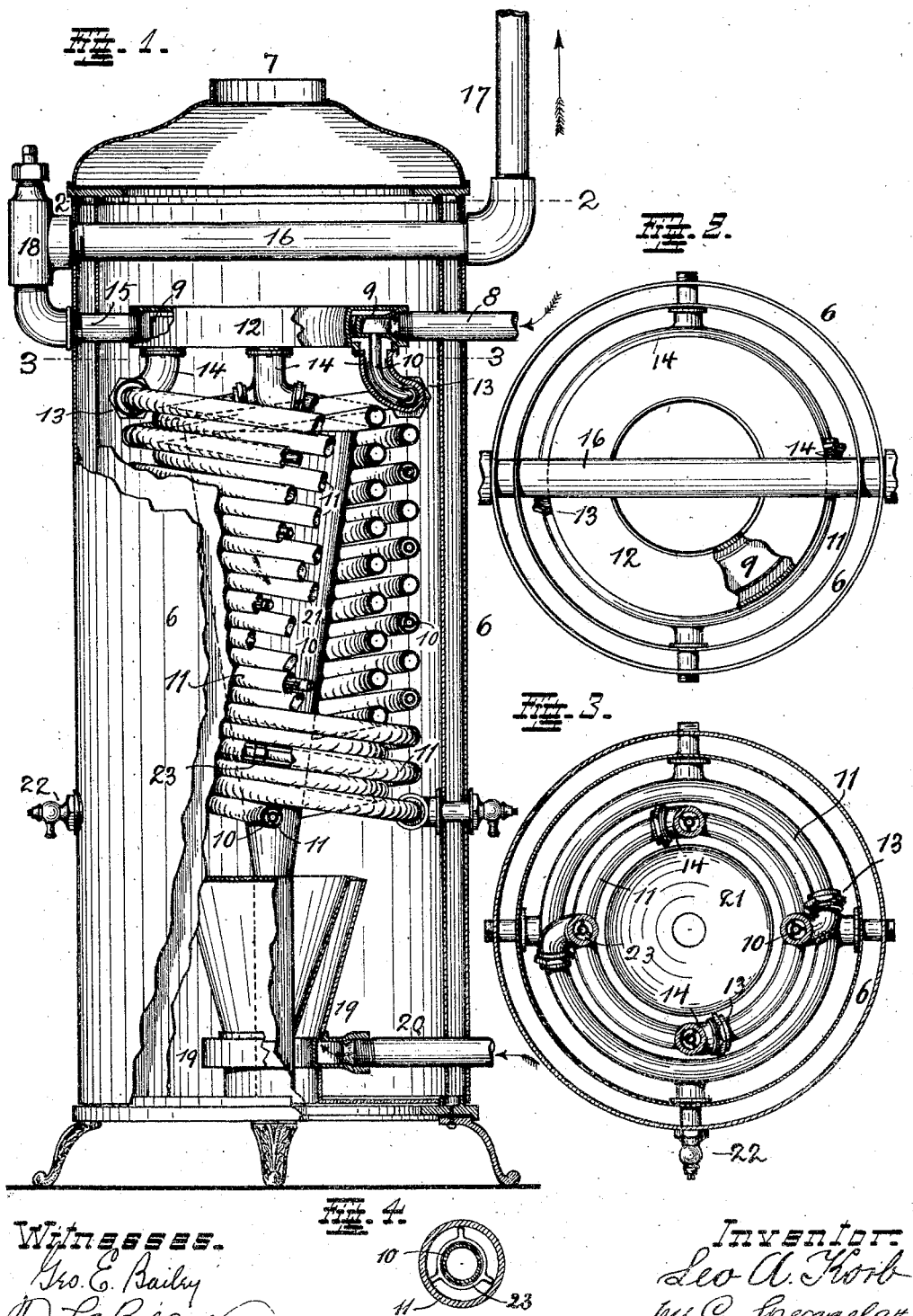

LEO A. KORB, OF RICHWOOD, WEST VIRGINIA, ASSIGNOR OF ONE-HALF TO BERNARD SICKING, OF CINCINNATI, OHIO.

WATER-HEATER.

1,047,893.  Specification of Letters Patent.  Patented Dec. 17, 1912.

Application filed March 18, 1912. Serial No. 634,560.

*To all whom it may concern:*

Be it known that I, LEO A. KORB, a citizen of the United States, and residing at Richwood, Nicholas county, State of West Virginia, have invented certain new and useful Improvements in Water-Heaters; and I do declare the following to be a clear, full, and exact description of the invention, attention being called to the drawing which accompanies this application and forms a part thereof.

This invention relates to water-heaters and consists of certain improvements in the construction as hereinafter described and claimed and as illustrated in the accompanying drawing, in which:—

Figure 1, is a vertical section of my improved water-heater and Figs. 2 and 3, are horizontal sections thereof taken on lines 2—2 and 3—3 respectively of Fig. 1. Fig. 4, shows an enlarged sectional detail-view.

This heater belongs to the type of heaters in which the water is heated in pipes exposed to heat and which pipes form a connected part of a supply-service, so that when water is drawn from this service, flow of water is also caused through these heating-pipes, the water being heated while passing through them.

The inclosure of the heater consists of a shell 6, preferably double-walled and is closed on top, except for an opening 7 to permit flue-connection. The cold water enters through a pipe 8 into an annular manifold 9 within the upper part of the inclosure and in this manifold is divided by being caused to pass through a number of coiled pipes 10 open at their lower ends each pipe receiving a part of the water. Each pipe of these coils is surrounded by a coiled pipe 11 of larger diameter, which latter pipes are closed at their lower ends and open at their upper ends where they join to another annular manifold 12 fitted around manifold 9 with a space between them to permit the water to pass.

The connection of coils 11 is by couplings 13 to nipples 14 on said manifold. The water leaves manifold 12 through an outlet-pipe 15 which leads to the outside of the inclosure, and after a short vertical turn is returned to pass again horizontally through the inclosure as shown at 16, finally leaving the heater as shown at 17.

The object of the short vertical turn outside of the inclosure is to permit positioning of a valve 18 whereby the flow of water through the pipes is regulated and controlled so as to be proportionate to the heating capacity of the device. Heat is provided by means of a suitable burner 19, preferably of the ring-type, supplied by a fuel-pipe 20.

21 is a vertical, outwardly flaring deflector supported inside of the coils, the object of which is to direct the heat laterally and outwardly against these coils, so as to increase the effect of the heat.

As will be understood, the cold water passes down through the inner pipes 10 and leaves them at their lower open ends where it enters the outer pipes 11 through which it ascends. No drippage from condensation has to be taken care of, inasmuch as these cold-water pipes do not come in direct contact with the heat.

The lower end of each of the outer pipes 11 is provided with a drip-cock 22 to permit draining of the coils whenever desired for any purpose. Spacing spiders 23 may be provided at intervals to keep the inner pipes spaced from the outer ones. See Fig. 4.

Having described my invention, I claim as new:

1. In a water-heater, a series of sets of pipes one within the other and both pipes of each set shaped to form concentric coils which are in open communication with each other at one end of the pipes, a manifold to which one of the ends of all the inner pipes of each set connect and another manifold to which one of the ends of all the outer pipes of each set connect.

2. In a water-heater, the combination of two annular manifolds one within the other, an intake for the inner manifold entering through the outer manifold, an outlet from the outer manifold, coupling members provided on the underside of this manifold, water-heating pipes connected at one of their ends to these couplings, pipes within these water-heating pipes and connected at one of their ends to the inner manifold, both sets of pipes shaped to form concentric coils which are in open communication with each other, the free ends of the inner pipes being open and terminating within the outer pipes, the ends of which are closed beyond the open ends of the inner pipes, so that water may flow uninterruptedly from the inner manifold through these inner pipes and out through the outer pipes to the outer manifold, an inclosure which contains these manifolds and pipe-coils and means to supply heat to this inclosure.

3. In a water-heater, the combination of an inclosure, manifolds horizontally supported therein, heating coils depending from these manifolds, an inlet to these manifolds, an outlet therefrom extending outside of the inclosure, a return branch horizontally traversing the inclosure above the manifolds, a regulating valve between this return branch and the outlet mentioned and a branch leading away from the return branch to a final outlet.

In testimony whereof, I hereunto affix my signature in the presence of two witnesses.

LEO A. KORB.

Witnesses:
 G. W. DAWSON,
 JNO. F. COOK.